Sept. 24, 1957    P. W. SIEBER ET AL    2,807,767
SPEED CONTROL OF ELECTRIC MOTORS
Filed May 19, 1955
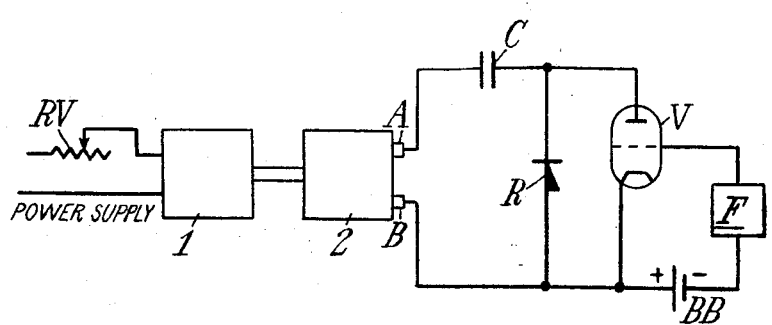
Inventors
P. W. Sieber
S. N. Couzens
Attys.

United States Patent Office 2,807,767
Patented Sept. 24, 1957

2,807,767

SPEED CONTROL OF ELECTRIC MOTORS

Peter William Sieber and Sydney Norman Couzens, Beckenham, England, assignors to Muirhead & Co. Limited, Beckenham, England Application May 19, 1955, Serial No. 509,586

Claims priority, application Great Britain April 22, 1955

1 Claim. (Cl. 318—303)

This invention relates to a method of controlling the speed of electric motors and is applicable to devices in which a very close control of speed, i. e. constant to within one part in 100,000 or better, is required despite variations in line voltage and other operating conditions.

A speed control device is known in which a single-phase alternator is driven by the motor whose speed is to be controlled. The output of the alternator is applied to a transformer having a centre-tapped secondary. The anodes of two triode thermionic valves are connected respectively to the outer ends of the transformer secondary, the centre-tap being connected to the valve cathodes, which are joined. An oscillator to provide a reference frequency is connected to the primary of a second transformer, also having a centre-tapped secondary winding. The outer ends of the secondary windings of the second transformer are connected to the grids of the valves and the centre-tap is connected to the cathodes, suitable grid bias means being incorporated according to the known art.

When in operation the two valves pass current during alternative half-cycles of the alternating current produced by the generator, thus loading the motor. The current passed by the valves varies according to the relative phase of grid and anode voltages. The arrangements are such that the variation in load required to keep the motor running at a constant speed lies between the two extremes provided by the control and, in this way, the motor is kept running at a speed determined by the reference frequency and the variations in load required to keep it running at the predetermined speed only result in a lag or lead of the motor shaft in relation to the reference frequency.

This method requires, in addition to the generator and the reference frequency source, two transformers, one of which is quite large, and two thermionic valves.

An object of the present invention is to provide a method of speed control which is equally precise but in which, by virtue of the circuit employed and by the use of a rectifier and a capacitor, both transformers and one valve are eliminated and the A. C. generator can be of smaller size for given requirements. The invention is therefore particularly useful where compact design and low weight are of paramount importance as, for example, in a portable picture telegraph transmitter or in equipment intended for use in aircraft. The cost of the apparatus is also substantially reduced.

The method of speed control according to the invention will now be described with reference to the accompanying drawing which shows by way of example one method of carrying the invention into practice.

Referring to the drawing, motor 1, whose speed is to be controlled, is coupled to a single-phase alternator 2 which for preference is arranged to provide a voltage at a relatively high frequency, for example 1,000 cycles per second. Alternator output terminal A is connected through capacitor C to the anode of valve V, whose cathode is connected to alternator output terminal B. A rectifier R is connected between anode and cathode of valve V so that it will pass current in the opposite direction to valve V. An oscillator F whose frequency is controlled by a tuning fork has one terminal connected to the grid of valve V and the other to bias battery B, the remaining terminal of battery B being connected to the cathode of valve V. The capacitance of C is preferably such that, in conjunction with the inductance of the alternator winding, it forms a tuned circuit resonating at approximately the desired alternator frequency.

The bias voltage of battery B may conveniently be equal to the peak-to-peak voltage of oscillator F so that when this voltage reaches its maximum positive value the grid voltage of valve V with respect to its cathode is zero. It will, however, be understood that the bias voltage may be set so that when the voltage of F reaches its maximum positive value the grid is either negative or positive and such a variation may be made to suit the valve characteristics or as an initial adjustment to vary the load on alternator 2.

Capacitor C serves several purposes. By tuning the inductance of the alternator winding to resonance it enables the maximum current to be drawn from the alternator so that the smallest possible machine may be used for a given purpose. It also acts as a "voltage booster" to increase the anode voltage of valve V. Further, in conjunction with rectifier R it provides during each negative half-cycle of the alternator, a load equivalent to the load provided by valve V during the preceding positive half-cycle.

The operation of the device according to the invention is as follows. Assuming that the motor is running and capacitor C has been charged so that the side connected to anode of valve V is positive, then during the positive half-cycle of the alternator, that is, when terminal A is positive, the alternator voltage and the voltage across capacitor C act in series and the combined voltage is applied to the anode of valve V which passes current, tending to reduce the voltage of C. During the negative half-cycle the alternator voltage acts in opposition to the remaining voltage across capacitor C and current from the alternator passes through rectifier R to recharge capacitor C. During this charging period the voltage applied to the anode of valve V is negative. It will be apparent that the total charge taken by capacitor C during the negative half-cycle equals the discharge through valve V during the previous positive half-cycle. Thus the average load on the alternator is equal for the two half-cycles.

If the alternator voltage is in phase with the voltage of oscillator F, then as the anode voltage rises the grid becomes less negative and the anode voltage reaches its peak at the instant when the grid is at its most positive point. Thus a heavy anode current is taken by valve V and a heavy load is imposed on motor 1 by alternator 2. If, on the other hand, the alternator voltage lags the grid voltage to the extent that the grid reaches its most positive point at the instant when the anode voltage is zero, then as the anode voltage rises the grid becomes increasingly negative and when the anode voltage reaches its peak the grid is near its most negative point. Thus the current taken by valve V is very small and the load imposed by alternator 2 on motor 1 is correspondingly small. Between these two extreme conditions the anode current of valve V, and hence the load thrown by alternator 2 on motor 1, varies according to the amount by which the alternator voltage lags behind the voltage of oscillator F. An initial adjustment is made by means of variable resistance RV to ensure that the variations in operating conditions likely to affect the speed of motor 1 lie within the range of control afforded by alternator 2.

The arrangement is adjusted so that the motor is unable to sustain the maximum load imposed on the alternator by the valve and it is therefore retarded. In consequence the alternator voltage lags in phase behind the grid voltage with the result that the anode current, and hence the load on the alternator, is reduced below the maximum. Conversely, if the load on the motor at any instant is too light, then its shaft begins to advance and the alternator voltage also begins to advance towards the in-phase conditions, thus increasing the valve anode current and the consequent load on the motor. In this way the motor is kept running at a speed corresponding to the tuning fork frequency and the control only has the effect of advancing or retarding its shaft through part of a revolution.

Assuming that motor 1 is running at 3,000 R. P. M. and that alternator 2 is delivering a voltage at a frequency of 1,000 C. P. S., then one revolution of the motor shaft corresponds to 20 cycles and the proportion of one cycle which corresponds to the full range of operation of the control represents only a few degrees of rotation of the motor shaft. Thus motor 1 is kept running at a speed corresponding exactly to the frequency of oscillator F and under normal conditions the speed control only causes a lag or lead of a few degrees of motor shaft rotation. If desired a vibration-damping flywheel may be mounted on the motor shaft.

It will be clear that for a given motor speed an increase in alternator frequency, that is, an increase in the number of alternator cycles per revolution of the motor shaft, will reduce the phase angle of lag in the motor shaft required to reduce the alternator load from maximum to minimum, thereby increasing the accuracy of the control. It will also be understood that by using an accurate, variable-frequency oscillator instead of fixed frequency oscillator F, a highly accurate variable speed control may be provided. Such a control would only function over a limited range.

The speed control according to the invention may be used to drive a mechanism and/or it may be coupled to a second alternator or a generator to provide an alternating current of closely controlled frequency and voltage or a direct current of closely controlled voltage.

What we claim is:

Speed control apparatus for an electric motor comprising in combination, an alternator to be driven by the motor whose speed is to be controlled, a capacitor connected in series with said alternator, a triode thermionic valve having its anode connected to said capacitor and its cathode connected to said alternator, a rectifier connected between the anode and cathode of said thermionic valve to pass current in the opposite direction, and a reference frequency source connected between the grid and cathode of said thermionic valve, said capacitor in conjunction with the inductance of the alternator forming a tuned circuit resonating at approximately the alternator frequency corresponding to the desired motor speed.

References Cited in the file of this patent

UNITED STATES PATENTS

| | | |
|---|---|---|
| 1,994,230 | Purington | Mar. 12, 1935 |
| 2,383,360 | Artzt | Aug. 21, 1940 |